US009810822B2

(12) United States Patent
Sakat et al.

(10) Patent No.: US 9,810,822 B2
(45) Date of Patent: Nov. 7, 2017

(54) ANGULAR OPTICAL FILTERING ELEMENT FOR ANGULAR FILTERING HAVING CONTROLLED ANGULAR SELECTIVITY

(71) Applicants: CENTRE NATIONAL DE LA RECHERCHE SCIENTIFIQUE, Paris (FR); OFFICE NATIONAL D'ETUDES ET DE RECHERCHES AÉROSPATIALES, Châtillon (FR)

(72) Inventors: Emilie Sakat, Gometz-la-Ville (FR); Riad Haïdar, Paris (FR); Jean-Luc Pelouard, Paris (FR); Patrick Bouchon, Verrières-le-Buisson (FR); Grégory Vincent, Massy (FR)

(73) Assignees: CENTRE NATIONAL DE LA RECHERCHE SCIENTIFIQUE—CNRS, Paris (FR); Office National d'Etudes et de Recherches Aérospatiales—ONERA, Palaiseau (FR)

( * ) Notice: Subject to any disclaimer, the term of this patent is extended or adjusted under 35 U.S.C. 154(b) by 147 days.

(21) Appl. No.: 14/899,438

(22) PCT Filed: Jun. 17, 2014

(86) PCT No.: PCT/EP2014/062766
§ 371 (c)(1),
(2) Date: Dec. 17, 2015

(87) PCT Pub. No.: WO2014/202636
PCT Pub. Date: Dec. 24, 2014

(65) Prior Publication Data
US 2016/0146989 A1    May 26, 2016

(30) Foreign Application Priority Data

Jun. 17, 2013 (FR) .................................... 13 55653

(51) Int. Cl.
*G01J 5/20* (2006.01)
*G02B 5/20* (2006.01)
(Continued)

(52) U.S. Cl.
CPC ............ *G02B 5/208* (2013.01); *G01J 1/0492* (2013.01); *G01J 5/20* (2013.01); *G02B 5/008* (2013.01);
(Continued)

(58) Field of Classification Search
CPC .......... G02B 5/20; G02B 5/204; G02B 5/208; G02B 5/22; G02B 5/26; G02F 1/07;
(Continued)

(56) References Cited

U.S. PATENT DOCUMENTS

| 6,075,632 A * | 6/2000 | Braun | H04B 10/07953 |
| | | | 359/634 |
| 7,092,133 B2 * | 8/2006 | Anderson | G11B 7/0065 |
| | | | 359/22 |

(Continued)

OTHER PUBLICATIONS

Office Action in counterpart European Patent Application No. 14 731 258.1 issued Jan. 2, 2017 (5 pages).
(Continued)

*Primary Examiner* — Marcus Taningco
*Assistant Examiner* — Djura Malevic
(74) *Attorney, Agent, or Firm* — Osha Liang LLP

(57) ABSTRACT

According to one aspect, the invention relates to an angular optical filtering element ($E_i$) optimized for angular filtering about a given operating angle of incidence ($\theta_{i,1}$) in a given spectral band. The angular filtering element ($E_i$) comprises a first nanostructured, band-pass, spectral filter ($11_i$, 301) and a second nanostructured, band-pass, spectral filter ($12_i$, 302). Each of the first and second spectral filters comprises, respectively, in said spectral band, a first and a second (Continued)

central filtering wavelength that respectively has a first and second angular dispersion curve defined depending on the angle of incidence ($\theta_{inc}$) on the optical filtering element ($E_i$), the curves of angular dispersion being secant about the operating angle of incidence ($\theta_{i,1}$) of the optical filtering element. The invention applies to the production of a selective angular filtering device and to a multidirectional optical detection system.

16 Claims, 8 Drawing Sheets

(51) Int. Cl.
| | |
|---|---|
| G02B 5/00 | (2006.01) |
| G02B 5/18 | (2006.01) |
| G01J 1/04 | (2006.01) |
| G02B 5/22 | (2006.01) |
| G02B 5/26 | (2006.01) |
| G02B 5/28 | (2006.01) |

(52) U.S. Cl.
CPC .......... *G02B 5/1809* (2013.01); *G02B 5/201* (2013.01); *G02B 5/203* (2013.01); *G02B 5/22* (2013.01); *G02B 5/26* (2013.01); *G02B 5/281* (2013.01); *G02B 5/288* (2013.01); *G01J 2005/202* (2013.01)

(58) Field of Classification Search
CPC . G02F 1/035; G02F 1/03; F01J 1/0492; G01J 5/20; G01J 2005/202
See application file for complete search history.

(56) References Cited

U.S. PATENT DOCUMENTS

| | | | | |
|---|---|---|---|---|
| 7,167,286 | B2* | 1/2007 | Anderson | G11B 7/0065 359/22 |
| 2005/0153105 | A1* | 7/2005 | Shimmo | C03C 17/3482 428/172 |
| 2006/0007791 | A1* | 1/2006 | Bamdad | B82Y 10/00 369/13.53 |
| 2006/0273245 | A1* | 12/2006 | Kim | G01J 3/0259 250/226 |
| 2008/0239428 | A1* | 10/2008 | Bell | G11B 7/00772 359/30 |
| 2010/0059663 | A1* | 3/2010 | Desieres | G01J 3/02 250/226 |
| 2010/0328587 | A1 | 12/2010 | Yamada et al. | |
| 2011/0216229 | A1* | 9/2011 | Mary | B82Y 20/00 348/273 |
| 2013/0120843 | A1 | 5/2013 | Junger et al. | |

OTHER PUBLICATIONS

Sasaki et al; "CWDM Multi/Demultiplexer Consisting of Stacked Dielectric Interference Filters and Off-Axis Diffractive Lenses"; IEEE Photonics Technology Letters, vol. 15, No. 4, pp. 551-553; Apr. 1, 2003 (3 pages).
Guillaume Druart et al.; "Compact infrared pinhole fisheye for wide field applications"; Applied Optics; vol. 48, No. 6; pp. 1104-1113; 2009 (10 pages).
Riad Haïdar et al.; "Free-standing sub-wavelength metallic gratings for snapshot multispectral imaging"; Appl. Phys. Lett.; 96, 221104; 2010 (4 pages).
Petru Ghenuche et al.; "Optical extinction in a single layer of nanorods"; Phys. Rev. Lett.; 109, 143903; 2012 (7 pages).
Y. Ding et al.; "Doubly resonant single-layer bandpass optical filters"; Optics Letters; vol. 29, No. 10; pp. 1135-1137; 2004 (3 pages).
Anne-Laure Fehrembach et al.; "Experimental demonstration of a narrowband, angular tolerant, polarization independent, doubly periodic resonant grating filter"; Optics Letters; vol. 32, No. 15; pp. 2269-2271; 2007 (3 pages).
Patrick Bouchon et al.; "Wideband omnidirectional infrared absorber with a patchwork of plasmonic nanoantennas"; Optics Letters; vol. 37, No. 6; pp. 1038-1040; 2012 (3 pages).
Patrick Bouchon et al.; "Fast modal method for subwavelength gratings based on B-spline formulation"; J. Opt. Soc. Am. A; vol. 27, No. 4; pp. 696-702; 2010 (7 pages).
Angela Piegari et al.; "Variable narrowband transmission filters with a wide rejection band for spectrometry"; Applied Optics; vol. 45, No. 16; pp. 3768-3773; 2006 (6 pages).
S. Tibuleac et al.; "Narrow-linewidth bandpass filters with diffractive thin-film layers"; Optics Letters; vol. 26, No. 9; pp. 584-586; 2001 (3 pages).
Randy L. Haupt et al.; "Practical Genetic Algorithms"; Wiley-Interscience; 2004 (262 pages).
International Search Report issued in PCT/EP2014/062766 dated Oct. 20, 2014 (3 pages).
Written Opinion of the International Searching Authority issued in PCT/EP2014/062766 dated Oct. 20, 2014 (9 pages).
Sakat, E. et al.; "Metal-dielectric bi-atomic structure for angular-tolerant spectral filtering"; Optics Letters, vol. 38, No. 4, XP-001580490, Feb. 15, 2013, pp. 425-427 (3 pages).
Thurman, S. et al.; "Controlling the spectral response in guided-mode resonance filter design"; Applied Optics, vol. 42, No. 16, XP-055102895, Jun. 1, 2003, pp. 3225-3233 (9 pages).

* cited by examiner

ANGULAR OPTICAL FILTERING ELEMENT FOR ANGULAR FILTERING HAVING CONTROLLED ANGULAR SELECTIVITY

PRIOR ART

Technical Field of the Invention

The present invention relates to an angular optical filtering element for angular filtering with controlled angular selectivity, and a device for selective angular filtering at several angles of incidence. It is notably applicable to multidirectional optical detection, more particularly to multidirectional optical detection in the infrared.

Prior Art

The surveillance of very varied sites, such as the interior of buildings, in order to adapt the lighting, the heating and/or the air conditioning as a function of the detected human presence, access routes for surveillance, industrial sites with various risks (for example the detection of toxic leaks), or places of large public demonstrations in order to ensure their safety, require appropriate teledetection systems. Notably, optical detection in the infrared allows human presence to be detected and also allows the detection of gas having a spectral signature in the infrared (such as for example methane, carbon dioxide, ammonia, nitrogen protoxide, etc.). Currently, this type of teledetection is done by means of cameras equipped with "wide angle" objective lenses, such as for example the SecondSight® camera marketed by the company Bertin Technologies for gas detection. However, the high cost of these optics and the cost generated by the complexity of the images to be processed make these cameras particularly expensive. Recent publications have studied the possibility of producing very wide angle infrared imagers using a pinhole camera and an infrared detector, notably for surveillance applications (see for example G. Druart et al. "Compact infrared pinhole fisheye for wide field applications", Appl. Opt., 48(6) 1104-1113 (2009)). These imagers, compared with conventional optics, allow a cost and a space saving. However, optical lenses adapted to the wavelengths sought for detection are still required, which involves a high cost for the system.

In parallel with the development of wide angle infrared imaging systems for telesurveillance applications, for several years the growing development of nanostructured (or more precisely, sub-wavelength) optical filters has been observed, notably for multi-spectral imaging applications in the infrared. These band-pass filters may operate in transmission, in reflection or in absorption mode. Various technologies based on microelectronics technology, and which all allow massively parallel fabrications, are known.

Amongst nanostructured optical filters, interference filters are for example known (see for example A. Piegari, et al., "Variable narrowband transmission filters with a wide rejection band for spectrometry", Appl. Opt. 45.16, p. 3768-3773 (2006)). Interference filters are formed from multilayer assemblies, the nanostructuring being implemented in a direction normal to the surface of the layers.

Nanostructured optical filters, having a nanostructuring formed in the plane of the component are also known. Transmission filters comprising thick free-standing metal gratings (i.e. whose grating thickness is large compared with the width of the slits of the grating) are thus for example known for multispectral imaging applications (see for example R. Haidar et al., "Free-standing sub-wavelength metallic gratings for snapshot multispectral imaging", Appl. Phys. Lett., 96, 221104 (2010)). In the article by P. Ghenuche et al. ("Optical extinction in a single layer of nanorods", Phys. Rev. Lett., 109, 143903 (2012)), reflection filters are described that are formed from a dielectric grating. Filters are also known using guided mode resonance (or GMR). These filters may be all-dielectric, using reflection or transmission mode (see for example Y. Ding et al., "Doubly resonant single-layer band-pass optical filters", Opt. Lett., 29, 10 (2004) and A.-L. Fehrembach et al. "Experimental demonstration of a narrowband, angular tolerant, polarization independent, doubly periodic resonant grating filter", Opt. Lett., 32, 15 (2007)) or metal-dielectric (see for example E. Sakat et al., "Metal-dielectric bi-atomic structure for angular-tolerant spectral filtering", Opt. Lett., 38(4), 425 (2013)). Lastly, band-pass filters using absorption have been demonstrated for wavelength-selective detection applications (see for example P. Bouchon et al., "Wideband omni-directional infrared absorber with a patchwork of plasmonic nano-antennas", Opt. Lett., 37(6), 1038 (2012)). These absorption filters use structures of the MIM (abbreviation for metal-insulator-metal) type. In these publications, one general objective sought is to be able to define the spectral response of a band-pass filter according to a given specification, and to form by lithographic techniques patchwork layouts of band-pass filters on a single substrate for the fabrication of compact multispectral or wideband imagers.

The present invention proposes to use the technology of nanostructured optical filters to design an optical filtering element with controlled angular selectivity that will be able to be implemented in a multidirectional detection system, notably for low-cost telesurveillance applications in the infrared.

SUMMARY OF THE INVENTION

According to a first aspect, the invention relates to an optical filtering element optimized for angular filtering about a given angle of incidence of operation, within a given spectral band, comprising:
  a first nanostructured band-pass spectral filter comprising, within said spectral band, a first filtering central wavelength which exhibits a first angular dispersion curve, the angular dispersion curve representing the variation of the first filtering central wavelength determined as a function of the angle of incidence on the optical filtering element;
  a second nanostructured band-pass spectral filter comprising, within said spectral band, a second filtering central wavelength which exhibits a second angular dispersion curve representing the variation of the second filtering central wavelength determined as a function of the angle of incidence on the optical filtering element, the second angular dispersion curve being secant with the first angular dispersion curve around the angle of incidence of operation.

Each of the first and second spectral filters can for example be a filter operating in transmission or in reflection mode. In certain particular cases, one of the spectral filters may also be an absorption-mode filter.

Thus, at least a first spectral filter and a second spectral filter are arranged together which have secant (non-coincident) angular dispersion curves, a spectral filter, referred to as entry spectral filter being designed to receive the light flux incident on the filtering element and each successive filter being designed to receive the light transmitted or reflected by the preceding spectral filter. In this way, an angular optical filtering element is obtained whose pass band is centered on the angle for which the dispersion curves intersect. The angle of operation of the angular filtering element can therefore be controlled by the choice of the nanostructured spectral filters. Furthermore, by controlling the local slopes of the dispersion curves in the neighborhood of the angle of operation, together with the spectral pass bands of the filters, the angular selectivity of the filtering element is also controlled, thus allowing an optical filtering element to be produced with a controlled angle of incidence of operation and angular selectivity.

According to one variant, the first and second spectral filters are arranged in parallel planes. Alternatively, the second spectral filter may make a given angle with the first spectral filter.

According to one variant, at least one of the first and second nanostructured spectral filters is an interference filter, a guided mode resonance filter, a free-standing metal or dielectric grating filter, or else a filter comprising a resonance of the MIM (metal-insulator-metal) type.

According to a second aspect, the invention relates to a device for selective angular filtering at several given angles of incidence, comprising an array of optical filtering elements according to the first aspect, each being optimized for angular filtering about a given angle of incidence of operation.

By virtue of this combination of filtering elements, it is possible to form a "patchwork" of filters for filtering at various angles of incidence. Furthermore, since the first and second filters are nanostructured optical filters, massively parallel fabrication technologies, coming from microelectronics techniques will be able to be implemented in order to fabricate one or more matrices of first optical filters, on the one hand, and one or more matrices of second filters, on the other, thus allowing the production of a low-cost and limited size device for multidirectional angular filtering.

The matrices of spectral filters may be one- or two-dimensional matrices, where the arrangement of the spectral filters in each matrix can be regular or otherwise.

According to a third aspect, the invention relates to a multidirectional optical detection system comprising a device for selective angular filtering according to the second aspect and an array of optical detection elements, each optical detection element being associated with an optical filtering element for receiving the light flux transmitted by said filtering element at the angle of incidence of operation of said filtering element.

A device for multidirectional angular filtering according to the second aspect of the present description advantageously allows an omnidirectional optical "wide angle" system of the prior art, for example for the detection of presence, to be replaced. The reduction in the cost of this objective is accompanied by a simplification of the signals generated allowing a generalization of its use. For example, a presence (human, gas) is detected within a region of space when there is detection of a signal in the optical detection element corresponding to the optical filtering element.

According to one variant, an array of optical detection elements, or "pixels", is associated with one optical filtering element for receiving the light flux at the angle of incidence of operation of the filtering element and thus cumulating the signals received by the array of these detection elements. Alternatively, there can only be a single optical detection element associated with one optical filtering element.

According to one variant, the optical detection elements are arranged according to a one- or two-dimensional matrix comprising a plane carrier.

According to one variant, the optical detection elements have a band-pass spectral filtering function using absorption, and form one of the first or second spectral filters of the angular filtering elements of the multidirectional detection system.

According to one variant, the multidirectional optical detection system furthermore comprises a housing in which the device for selective angular filtering and the array of the optical detection elements are arranged.

According to a fourth aspect, the invention relates to a method for fabrication of a system for multidirectional optical detection according to the third aspect comprising:
the fabrication of a first matrix of first spectral elements on a first plane carrier;
the fabrication of a second matrix of second spectral elements on a second plane carrier;
the fabrication of a third matrix of optical detection elements on a third plane carrier;
the arrangement of said matrices in a housing.

The fabrication of each of the matrices can be carried out by known lithographic technologies, for example nanoprinting technologies, in order to reduce the costs of fabrication.

BRIEF DESCRIPTION OF THE DRAWINGS

Other advantages and features of the invention will become apparent upon reading the description, illustrated by the following figures.

DETAILED DESCRIPTION

In the figures, the elements are shown for the purposes of illustration and the scales are not adhered to. Furthermore, identical elements are identified by the same references.

Figure 1:
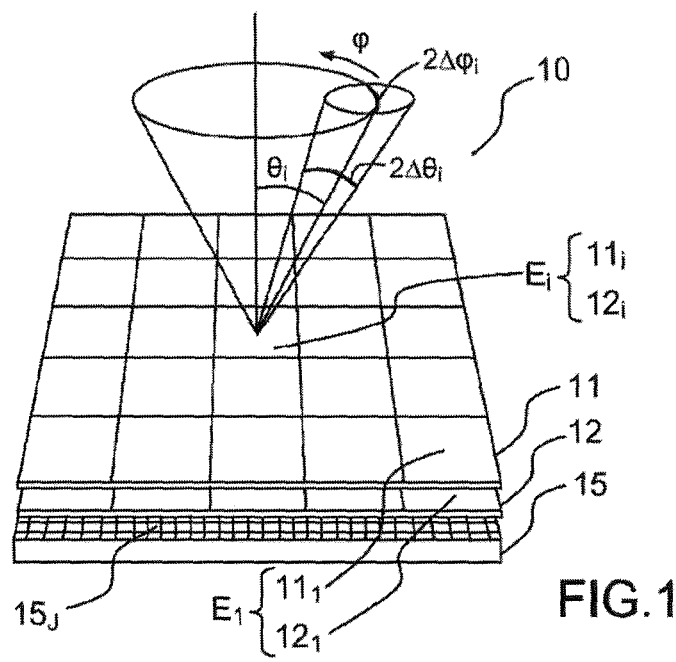
FIG. 1, the diagram of one example of a multidirectional optical detection system according to the present description.

FIG. 1 shows schematically one example of a multidirectional optical detection system 10 according to the present description. The detection system 10 is designed to operate within a given spectral band depending on the application, for example in the infrared for the detection of human presence or the detection of gas. More precisely, the detection system may be designed to operate for example within the atmospheric transmission bands II (3-5 µm) or III (8-12 µm).

The multidirectional detection system 10 comprises an array of detection elements $15_j$, designed for detection within the desired spectral band of the detection system 10, and organized in this example in the form of a two-dimensional matrix 15. In the case of an operation in the infrared, the detection elements are for example microbolometers, allowing the production of a low-cost detection system. Alternatively, the detection elements may be cooled quantum detectors implementing a PN or PIN junction using semiconductors such as CdHgTe (cadmium mercury telluride or CMT), or a superlattice of InAs/GaSb (indium arsenide/gallium antimonide), or quantum wells of the type of those used in quantum well detectors or QWIP (abbreviation for Quantum Well Infrared Photodetectors) or in quantum cascade detectors (or QCDs) based on GaAs (gallium arsenide) and InP (indium phosphide), or photo-resistive or photo-capacitive detectors, or else, as will be described in more detail in the following, nanostructured detection elements incorporating a band-pass spectral filtering function in absorption mode.

The multidirectional detection system 10 also comprises an array of optical filtering elements $E_i$, each optical filtering element $E_i$, being optimized for angular filtering about a given angle of incidence of operation, within the desired spectral band. In the example in FIG. 1, the light flux transmitted by each angular filtering element $E_i$ at the angle of incidence of operation is received by several detection elements, the detection signal being then able to be summed within each angular filtering element. Alternatively, it is possible to only provide one detection element per angular filtering element $E_i$.

According to the present description, each angular filtering element $E_i$ comprises at least a first nanostructured band-pass spectral filter 11 and a second nanostructured band-pass spectral filter $12_i$. Thus, in the example in FIG. 1, the angular filtering element $E_1$ comprises an entry spectral filter $11_1$ designed to receive the light incident on the angular filtering element $E_1$ and an exit spectral filter of $12_1$ designed to receive the light flux transmitted by the first spectral filter $11_1$. In this example, the first and second spectral filters operate in transmission mode. In the example in FIG. 1, the first spectral filters $11_i$ are organized in the form of a first, substantially plane, two-dimensional matrix 11 and the second spectral filters $12_i$ are organized in the form of a second two-dimensional matrix 12, being substantially plane and parallel to the first matrix. In the example in FIG. 1, the patchwork layout consisting of a rectangular pattern is only one example. The disposition of the spectral filters in this plane is of any kind.

According to the present description, each of the first and second spectral filters $11_i$, $12_i$ composing the angular filtering element $E_i$, respectively comprises, in the spectral band of operation of the multidirectional detection system, a first filtering central wavelength and a second filtering central wavelength, the first and second filtering central wavelengths having secant angular dispersion curves around the desired angle of operation for the angular filtering element. In the present description, 'angular dispersion curve of a spectral filter $11_i$, $12_i$,' refers to the curve representing the variation of the filtering central wavelength (or of the wave number, inverse of the wavelength) of the spectral filter as a function of the angle of incidence on the angular filtering element to which the spectral filter belongs. In the case of two spectral filters $11_i$, $12_i$ operating in transmission mode and arranged so as to be substantially parallel, as in the example in FIG. 1, it will be understood that the angle of incidence on the angular filtering element is also the angle of incidence on each of the spectral filters $11_i$, $12_i$. In the case of spectral filters operating in reflection, or arranged in a non-parallel manner, the angle of incidence on the angular filtering element could differ from the angle of incidence on the second spectral filter, as will be explained in more detail in the following.

Generally speaking, a nanostructured band-pass spectral filter exhibits, at a given azimuthal angle $\phi_i$, a filtering function (in transmission, in reflection, or in absorption mode) $F_i(\lambda, \theta_{inc})$ depending both on the angle of incidence $\theta_{inc}$ and on the wavelength λ. Thus, by combining two spectral filters having different angular dispersions, the filtering function F of the whole assembly, equal to the product of the filtering functions of the two filters ($F=F_1 \times F_2$), will only be significant within a cone in which the filtering function through the two filters is significant. The axis of this cone is given by the angle ($\theta_i$, $\phi_i$) for which the dispersion curves of the two spectral filters intersect, in the present description referred to as angle of operation of the angular filtering element. The angles at the apex ($2\theta_i$, $2\Delta\phi_i$) of this cone, characterized by the intervals $[\theta_i-\Delta\theta_i, \theta_i+\Delta\theta_i]$ and $[\phi_i-\Delta\phi_i, \phi_i+\Delta\phi_i]$, define the cone in which the filtering function is significant, in other words higher than a given percentage of the maximum value $F_{max}$, of the filtering function. The angular intervals $[\theta_i-\Delta\theta_i, \theta_i+\Delta\theta_i]$ and $[\phi_i-\Delta\phi_i, \phi_i+\Delta\phi_i]$ are respectively referred to as zenithal angular bandwidth ($2\Delta\theta_i$) and azimuthal angular bandwidth ($2\Delta\phi_i$). For example, the cone of operation of the angular filtering element may be defined by the cone within which the filtering function is greater than $F_{max}/5$.

Figure 2A:
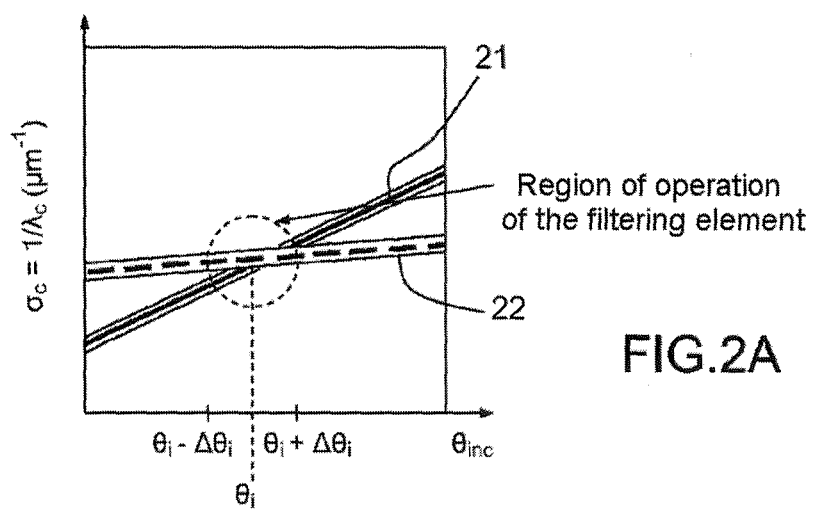
FIGS. 2A and 2B, two examples of crossing angular dispersion curves of a first spectral filter and of a second spectral filter, for the formation of an angular optical filtering element according to the present description.
Figure 2B:
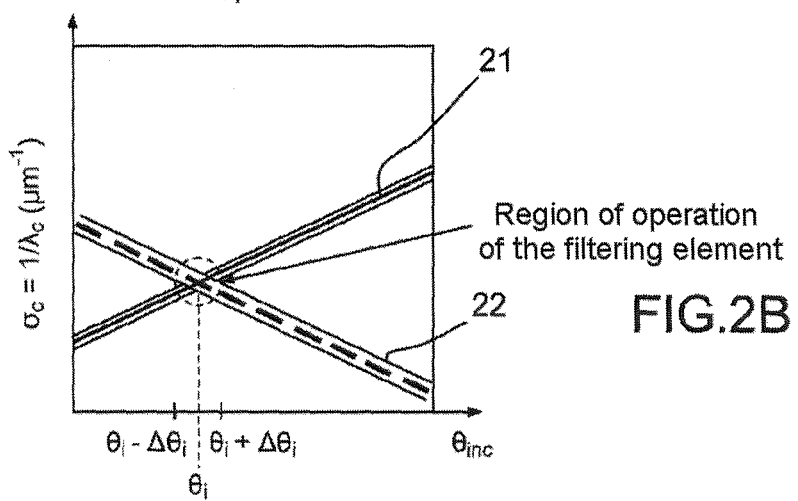

FIGS. 2A and 2B illustrate dispersion curves 21, 22 of two spectral filters, according to two examples. Here, the dispersion curves show the wave number $\sigma_c$, inverse of the centering wavelength $\lambda_c$ of each band-pass spectral filter, as a function of the angle of incidence $\theta_{inc}$ on the angular filtering element, for a given azimuthal angle. These figures show the angle of incidence $\theta_i$ for which the two angular dispersion curves intersect and the angular bandwidth $2\Delta\theta_i$. From these figures, it can be observed that the angular selectivity of the angular filtering element $E_i$ according to the present description depends on the differences between the angular dispersions of the first and second spectral filters composing it, and more precisely, on the difference in slope in the neighborhood of the angle of operation. Thus, in order to obtain a low angular selectivity ($\Delta\theta_i$ large), filters may be chosen that have dispersion relations close to one another (FIG. 2A). In contrast, an angular filter with a high selectivity ($\Delta\theta_i$ small) will be obtainable by assembling spectral filters having greatly contrasting dispersion relations, for example two filters with a large dispersion whose slopes are of opposite sign (FIG. 2B). It is furthermore observed that the angular selectivity of the angular filtering element $E_i$ of the invention is also dependent of the spectral pass bands of the first and second filters composing it. Indeed, the narrower spectral pass band of the two filters, the higher the angular selectivity (see FIGS. 2A and 2B: the narrower the bands 21 and 22, the smaller $\Delta\theta_i$) will be. Indeed, the angular sector in which the pass bands of the two spectral filters $11_i$ and $12_i$ overlap has a smaller zenithal angle at the apex ($2\Delta\theta_i$).

The current technology of nanostructured band-pass spectral filters allows filters to be produced with controlled dispersion curves, allowing the formation of angular filtering elements with angles of incidence of operation and with zenithal and azimuthal angular bandwidths determined according to the application.

For this purpose, a known solution is to employ algorithms referred to as "genetic algorithms". The genetic algorithm derives its name from the analogy which is made with the natural selection within a species. It consists in exploring a population of objects as a function of their properties, and in relation with a targeted property. For this purpose, the variables to be optimized are defined (for example the dimensions of the structurings), a property with a target value (for example the transmission at a given angle) and a convergence criterion (for example the difference from the targeted transmission value). Selection and crossing operations allow new generations of objects to be created whose properties tend, in the course of the iterations, toward the target values. Such genetic algorithms are for example described in R. L. Haupt et al. ("Practical genetic algorithms", Wiley-Interscience (2004)).

By grouping a set of these filtering elements, as is illustrated for example in FIG. 1, it is possible to produce a device for selective angular filtering at several given angles of incidence. Furthermore, by arranging the first and second spectral filters in the form of matrices, it is possible to use the known techniques of microelectronics for a massively parallel, low-cost, production.

In the illustrative example in FIG. 1, the first and second spectral filters $11_i$, $12_i$ are filters operating in transmission mode. However, the current technologies of nanostructured filters allow spectral filters to be produced with a controlled dispersion curve in transmission, in reflection and in absorption mode.

Figure 3:
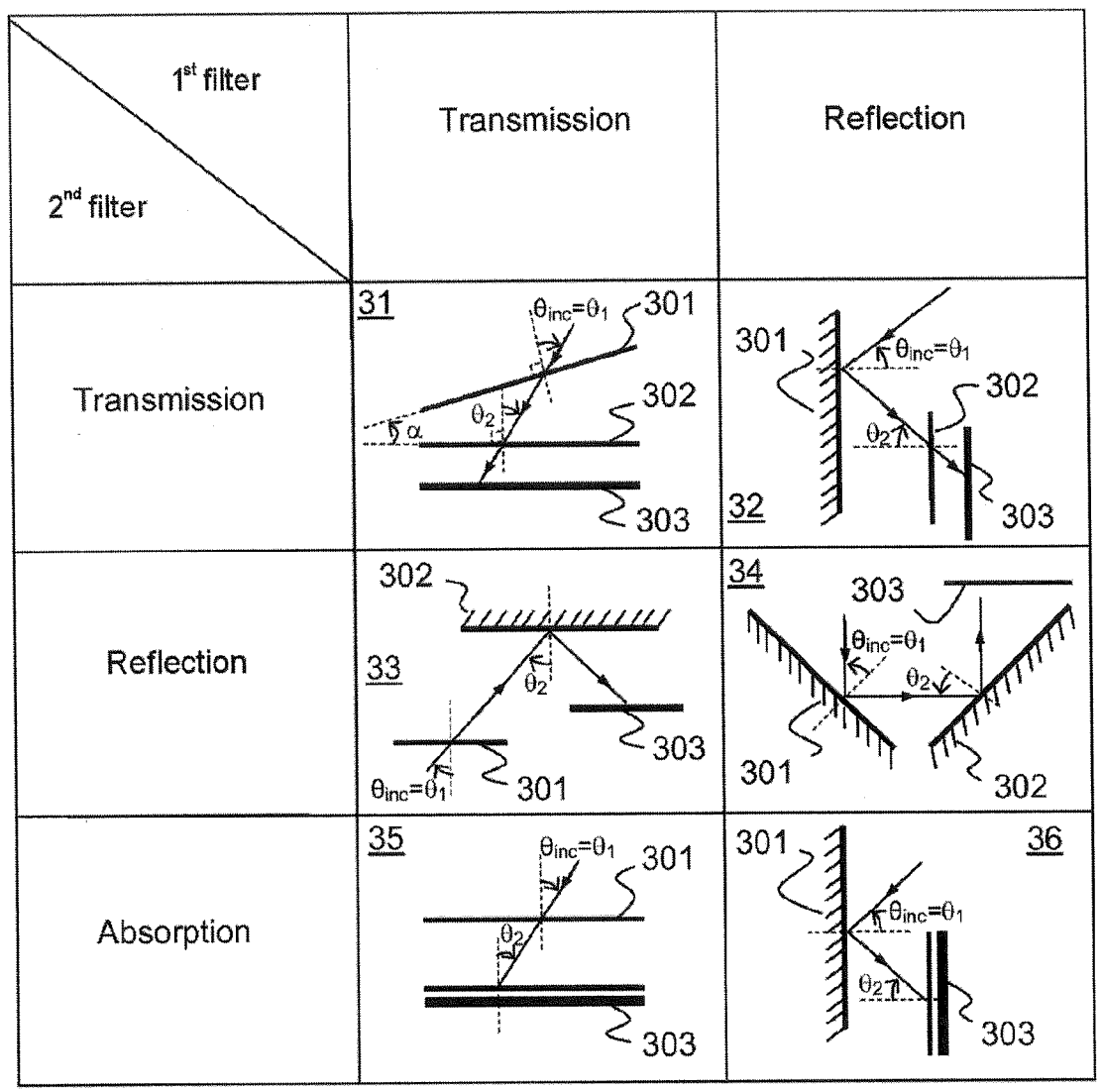
FIG. 3, a table depicting various possible configurations for a multidirectional optical detection system according to the present description.

FIG. 3 shows a table schematically illustrating various possible arrangements, referenced 31 to 36, for a multidirectional optical detection system according to the present description. In each of the configurations, the spectral filter receiving the incident light flux ("entry spectral filter") is referenced 301, the spectral filter receiving the light transmitted or reflected by the entry spectral filter is referenced 302 ("exit spectral filter") and the detection element is referenced 303. The angle of incidence on the entry spectral filter is denoted $\theta_1$, this is also the angle of incidence $\theta_{inc}$ on the angular filtering element composed of the first and second spectral filter. The angle of incidence on the exit spectral filter is denoted $\theta_2$, it is equal to the angle of incidence $\theta_{inc}$ on the angular filtering element when the entry and exit spectral filters are in substantially parallel planes. When the entry and exit spectral filters are not in parallel planes, the angle of incidence $\theta_2$ on the exit spectral filter may differ from the angle of incidence $\theta_{inc}$ on the filtering element.

In practice, the determination of the angular filtering element composed of the first and the second spectral filter and giving, within a given spectral band, an angular filtering function about a given angle of incidence of operation, will be able to be achieved in the following manner. For the desired angle of operation, an exit spectral filter could be chosen with a known angular dispersion curve which will give, as a function of the angle of incidence $\theta_{inc}$ on the filtering element, the filtering central wavelength of the exit spectral filter by a simple change of variable. The entry spectral filter could then be chosen with a known angular dispersion curve, which will filter at the angle of incidence $\theta_{inc}$ this same filtering central wavelength. The configuration shown in the case 31 of the table thus shows two spectral filters 301 and 302 operating in transmission mode and which have between them a non-zero angle $\alpha$, such that $\theta_2 = \theta_1 - \alpha$. In order to determine more easily the desired region of operation of the angular filtering element formed from the two spectral filters, $\lambda_{c1}(\theta_1)$, angular dispersion curve of the entry spectral filter 301, and $\lambda_{c2}(\theta_2) = \lambda_{e2}(\theta_1 - \alpha)$, angular dispersion curve of the exit spectral filter 302, could be made to coincide in such a manner that these dispersion curves intersect in the region of operation sought. In order to determine the appropriate angular dispersion curves, genetic algorithms such as previously described will for example be able to be implemented. Thus, reference could for example be made to S. Tibuleac et al. for the optimization of an all-dielectric GMR transmission filter (see S. Tibuleac et al. "Narrow-linewidth band-pass filters with diffractive thin-film layers", Opt. Lett. 26.9, p. 584-586 (2001)).

In the configurations displayed in the first column of the table, the entry spectral filter 301 operates in transmission mode. This may for example be a spectral filter using thick free-standing metal gratings (the thickness of the grating is large compared with the width of the slopes), such as described in the aforementioned article by R. Haïdar et al. This may also be a guided mode resonance filter, dielectric or metal-dielectric, such as described in the "Prior art" section of the present application. In the configurations shown in the second column of the table, the entry spectral filter 301 operates in reflection mode. This may also be a dielectric guided mode resonance filter or a nanostructured spectral filter formed from a dielectric grating (see for example the aforementioned article by P. Ghenuche et al.). The exit spectral filter 302 may be a transmission filter (configurations 31 and 32) or reflection filter (configurations 33, 34).

The configurations shown in the cases 35 and 36 of the table represent the case where the exit spectral filter is integrated into the detection element 303 which itself has a function of band-pass spectral filter. In this case, the spectral filtering operates in absorption mode (see for example the aforementioned article by P. Bouchon et al.).

For each of these filters, skillful use of simulation tools enables the physical characteristics of the structures to be determined allowing the desired angular dispersion curve to be obtained.

The configurations in transmission mode, such as shown for example in the cases 31 and 35 of the table, are advantageous in that they allow the size of the system to be minimized. The configurations in which a spectral filter operates in reflection mode are bigger than the preceding ones but they can allow access to be gained to very high angles of incidence (in particular in the case of the association of a reflection filter and of a transmission filter), such as will be described in the following.

Although the configurations presented in FIG. 3 implement angular filtering elements each comprising two spectral filters, it is possible to produce angular filtering elements with three spectral filters or more, with the aim for example of further increasing the angular selectivity. The spectral filters are then arranged together in such a manner that the succeeding spectral filter receives the light transmitted or reflected by the preceding spectral filter. In this case, the angular dispersion curves of each of the spectral filters, determined as a function of the angle of incidence on the angular filtering element to which it belongs, will be able to be secant (non-coincident) in the neighborhood of the angle of incidence sought for the angular filtering element.

Figure 7:
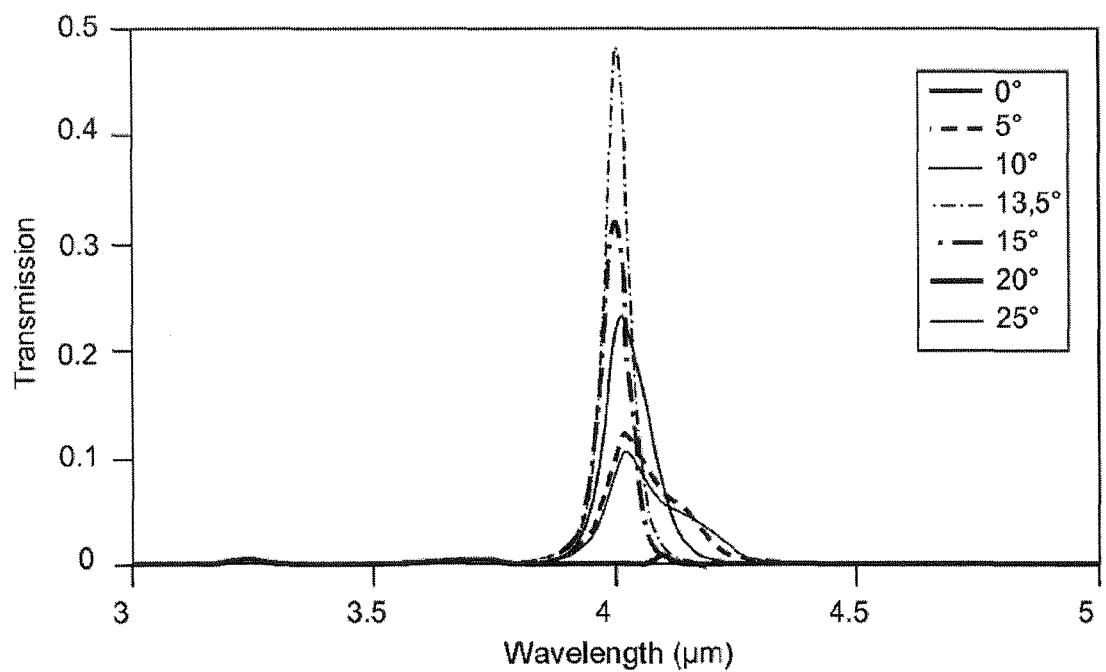
FIG. 7, a curve showing the transmission of an angular optical filtering element obtained by association of the first and second filters shown in FIGS. 5A and 5B.
Figure 8:
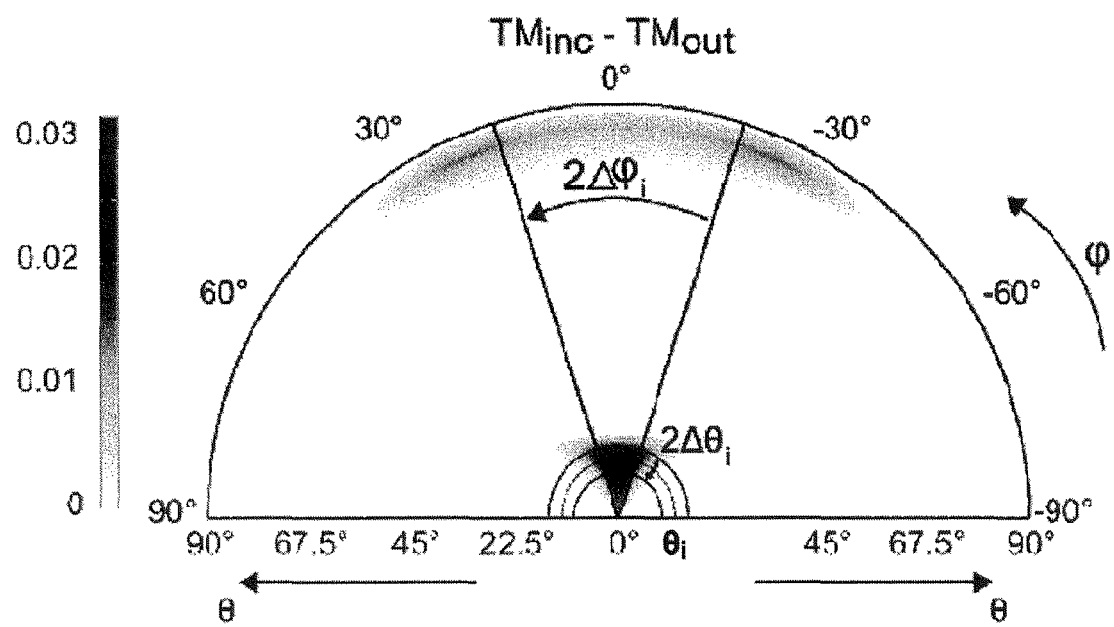
FIG. 8, a diagram showing the transmission TM at the exit of an angular optical filtering element obtained by association of the first and second spectral filters shown in FIGS. 5A and 5B, as a function of the angle of incidence and of the azimuthal angle.

The applicants have highlighted the feasibility of an angular filtering element according to the present description, both by means of numerical simulations and of experimental tests. FIGS. 7 and 8 show simulation results obtained with nanostructured band-pass spectral filters such as described by means of FIGS. 4 to 6.

Figure 4:
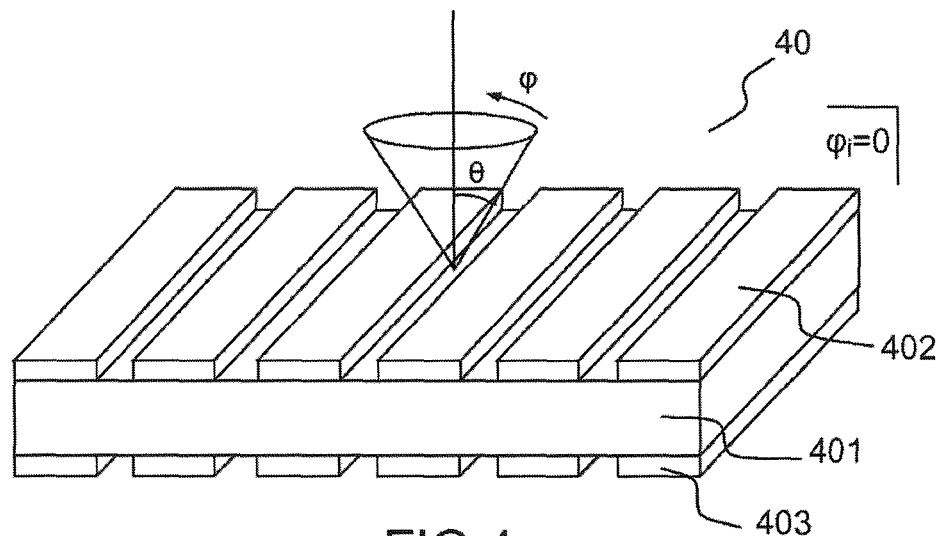
FIG. 4, one example of a spectral filter of the type using guided mode resonance for the formation of a spectral filter of an angular optical filtering element according to the present description.

The band-pass spectral filter 40 shown in FIG. 4 is a filter known as a guided mode resonance or GMR filter. The filter 40 comprises a waveguide 401 made of dielectric material (dielectric permittivity $\in_d$) comprising on each of its faces a one-dimensional metal grating (dielectric permittivity $\in_m$). The structure thus shown is highly reflective over the wavelength range in question because the metal grating has very narrow slits. At the resonance, on the other hand, the transmission of the component becomes significant. The orders ±1 diffracted by the grating are coupled with the eigenmodes of the dielectric waveguide. They are trapped in the waveguide and escape in transmission in the order 0 either directly or via a coupling of the orders ±1 with the diffraction grating. The detailed study of these gratings is described for example in the article by E. Sakat (see reference hereinabove). For the simulations presented in the present description, the B-Splines method described for example in the article by P. Bouchon et al. ("Fast modal method for sub-wavelength gratings based on B-spline formulation", J. Opt. Soc. Am. A, 27 696-702 (2010)) is used.

Figure 5A:
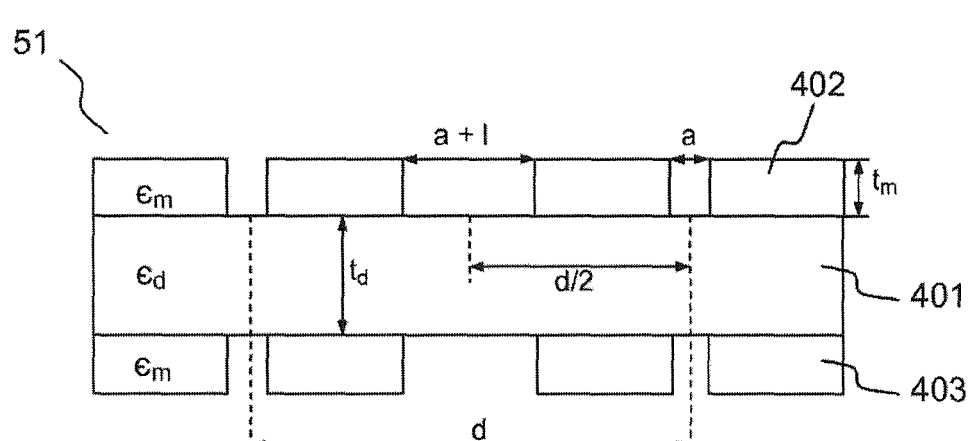
FIGS. 5A and 5B, examples respectively of a first spectral filter and of a second spectral filter for the implementation of an angular optical filtering element according to the present description.
Figure 5B:
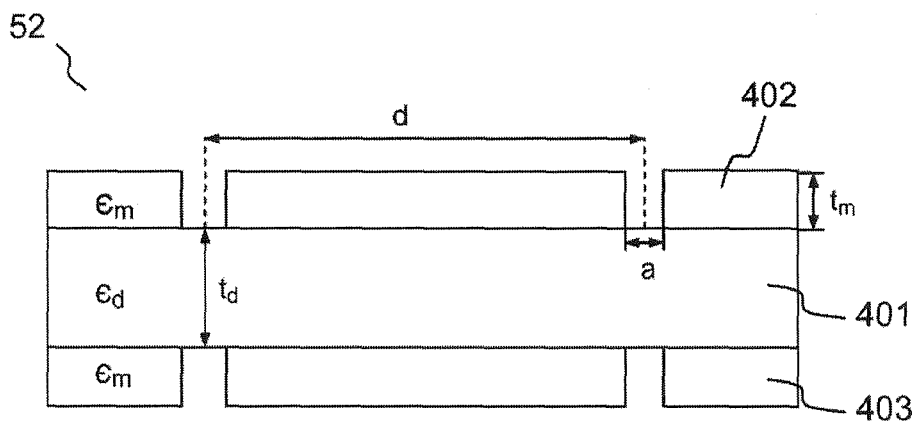

More precisely, the simulations have been carried out with an angular filtering element comprising an entry spectral filter 51, such as described in FIG. 5A, and an exit spectral filter 52 such as described in FIG. 5B.

The entry spectral filter 51 is composed of a dielectric waveguide 401 comprising, on each of its faces, a one-dimensional (1D) metal grating made of gold, the whole assembly being surrounded by air. The gratings 402, 403 are referred to as "bi-atomic" gratings. This is because they comprise two patterns per period d, a slit of width a and a slit of width a+l. A filter of this type can allow a very flat dispersion relation to be obtained for angles of incidence in the range between −25 and +25 degrees (in the plane of azimuthal angle $\phi=0$), and a TM polarization.

Figure 6A:
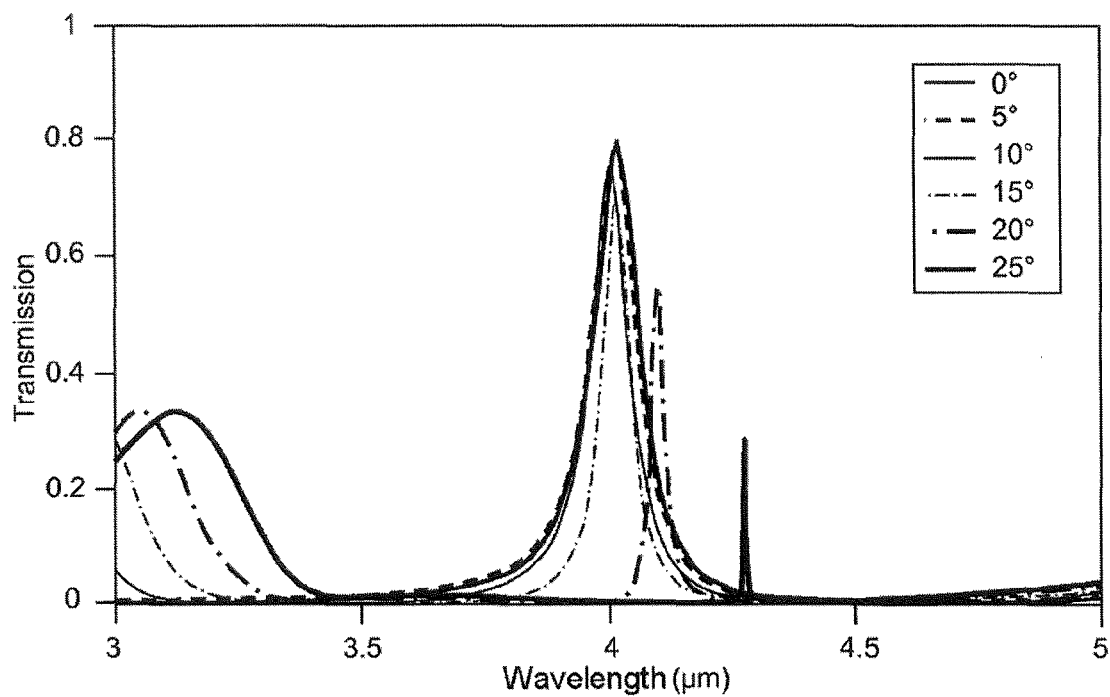
FIGS. 6A and 6B, the curves showing the transmission spectra respectively for the first and second spectral filters shown in FIGS. 5A and 5B for various angles of incidence.

FIG. 6A thus shows a series of transmission spectra calculated for an azimuthal angle of zero ($\phi=0$) for angles in the range between 0 and 25° of a first spectral filter such as shown in FIG. 5A. For this simulation, the waveguide 401 is chosen to be silicon nitride (SiN$_x$), with a dielectric permittivity $\in_d=4$, comprising, on each of its faces, a 1D metal grating made of gold. The parameters of the grating are: d=3 µm, $t_m=0.1$ µm, a=0.2 µm, l=0.5 µm, $t_d=0.7$ µm, n(SiN$_x$)=2. In this range of angles, the maximum TM transmission at the resonance is close to 80%. It is observed that, between $\theta_1=0°$ (normal incidence) and $\theta_1=25°$, the filtering central wavelength (around 4 µm) does not vary much.

The second spectral filter 52 is composed, as is the first spectral filter 51, of a dielectric waveguide 401 comprising, on each of its faces, a one-dimensional (1D) metal grating made of gold. In contrast to the preceding case, the gratings 402, 403 only consist of a single pattern per period d, a slit of width a. A filter of this type can allow a very high angular dispersion in the plane of zero azimuthal angle ($\phi=0$) to be obtained.

Figure 6B:
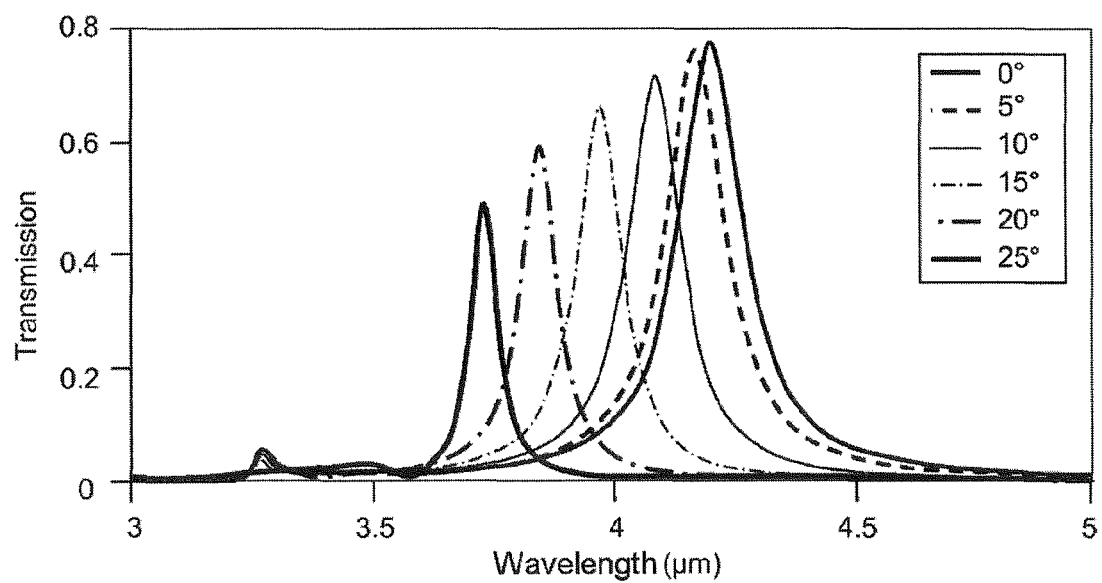

The FIG. 6B thus shows a series of transmission spectra calculated for an azimuthal angle of zero ($\phi=0$) for angles in the range between 0 and 25° of a second spectral filter as is shown in FIG. 5B. For this simulation, the waveguide 401 is chosen to be made of silicon nitride (SiN$_x$), with a dielectric permittivity $s_d=4$, comprising a 1D metal grating made of gold on each of its faces. The parameters of the grating are: d=2.5 µm, $t_m=0.1$ µm, a=0.3 µm, $t_d=0.8$ n(SiN$_x$)=2. It is observed that the maximum transmission shifts by 4.23 µm at normal incidence to 3.7 µm for an incidence of 25°. The maximum TM transmission (at the resonance) also varies from 78% to 50%.

Thus, the dispersion curves of the first and second spectral filters such as shown in FIGS. 5A and 5B, calculated in the plane of zero azimuthal angle ($\phi=0$) and with TM biasing (magnetic field H parallel to the slits of the grating), with the parameters stated hereinabove, are very contrasted. The first spectral filter exhibits a virtually-zero dispersion, whereas the second shows a strong positive dispersion (the resonance is shifted toward the shorter wavelengths when the angle of incidence increases). It is therefore expected that, by combining the first and the second spectral filters in order to form the angular filtering element, a high spectral selectivity will result. It can be observed that the resonance wavelengths of the two filters coincide ($\lambda_{c1}=\lambda_{c2}$) around an angle close to 13.5°. At $\lambda=4.005$ µm, $\theta=13.5°$, the transmissions of the filters are $T_1=70.73\%$ and $T_2=68.04\%$. An angular filter is therefore expected that has a resonance for $\lambda=4.005$ µm, $\theta_{inc}=13.5°$ with a total transmission $T=T_1 \times T_2=48.1\%$.

FIG. 7 shows transmission curves calculated with the two filters 51 and 52 previously described, separated by an air gap of 300 µm, for angles of incidence going from 0 to 25° and in the plane of azimuthal angle $\phi=0$. In accordance with the preceding observation, a transmission resonant at $\lambda=4.005$ µm, a maximum transmission for $\lambda=4.005$ µm and $\theta_{inc}=13.5°$ (T=48.1%), a narrow spectral width of the peak (full width at half-height FWHM of 60 nm and quality factor Q, defined by the ratio of the resonance wavelength over the width at half-height, of 67), an absence of transmission outside of the interval [3.8, 4.3] µm; as can be seen in FIG. 7, the transmission is less than 0.5% outside of this interval. The angular selectivity obtained is $\Delta\theta \approx +8°$.

These simulations show that the transmission of the angular filter is correctly described by the simple law: $T(\lambda, \theta)=T_1(\lambda, \theta)*T_2(\lambda, \theta)$. It is thus possible to design the parameters of the spectral filters independently from one another and to predict the performance characteristics of the angular filtering element obtained by their combination.

The results of the simulations presented hereinabove are situated within a plane of space of azimuthal angle zero, in other words $\phi=0$ (as is indicated in FIG. 4). In practice, it may be sought to target a detection within a cone of axis ($\theta_i$, $\phi_i$) and with angles at the apex ($2\Delta\theta_i$, $2\Delta\phi_i$).

FIG. 8 shows results of simulations carried out with an angular filtering element such as previously defined, for all the planes in space, for a TM polarized incident wave (magnetic field H orthogonal to the plane of incidence, i.e. parallel to the slits in the case $\phi=0$) and a detection also according to a TM biasing. More precisely, FIG. 8 shows a polar diagram representing the behavior of the angular filtering element as a function of the angle of incidence $\theta$ (radial axis) and of the azimuthal angle $\phi$ (angle in the polar diagram). The color scale corresponds to the integral of the TM transmission of the angular filtering element over the wavelength range [3.81–4.19] μm. This figure demonstrates a maximum transmission within a cone of light corresponding to $\theta_i=13.5\pm8°$ and $\phi_i=\pm20°$. The stray light patches (θ close to 90°), visible in FIG. 8, may be shielded either by the housing of the detector or by a field limiter screen.

Simulations made with TE incident biasing (electric field E parallel to the slits of the grating) show that, with an angular filtering element using this type of spectral filters, the TM polarized incident light is transmitted, along the axis of angular filtering, with a high transmission coefficient. Simulations made with a TM and TE incident biasing and with a TE detection show that very little light gets through the filtering element, whatever the zenithal θ and azimuthal φ angles of incidence. The angular filtering element is therefore a selective polarizing element within a light cone.

Figures 9A, 9B:
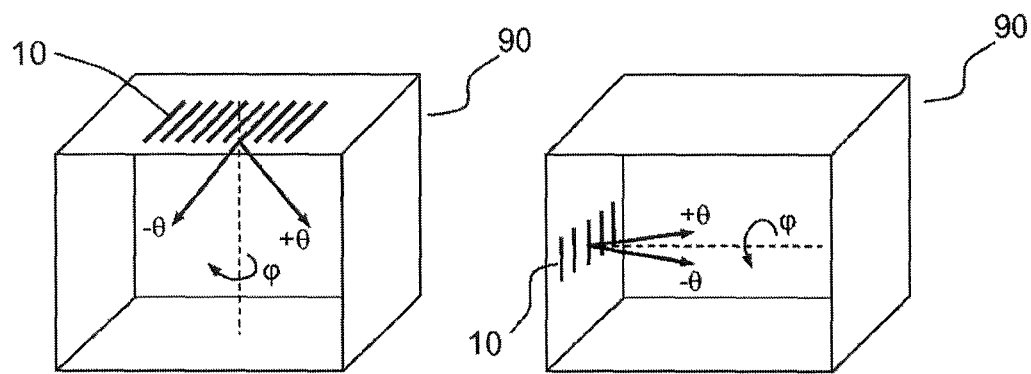
FIGS. 9A and 9B, exemplary implementations of multidirectional optical detection systems according to the present description.

FIGS. 9A and 9B show exemplary implementations within a volume 90, for example a room in a dwelling, of multidirectional optical detection systems 10 according to the present description. In the example in FIG. 9A, the detection system 10 is situated on the ceiling, whereas in the example in FIG. 9B, the detection system 10 is situated on a wall of the room. The multidirectional detection system, in this example, comprises angular filtering elements formed from spectral filters with one-dimensional gratings. The lines thus show schematically the slits of the grating. The plane φ=0 is orthogonal to the direction of the slits (it is in this plane that the angular selection of the filter is the most efficient). Only the TM polarized light (magnetic field H parallel to the slits of the grating) is transmitted. The angular filter allows the light within two cones centered on the directions (φ=0, θ) and (φ=0, −θ) to pass. The axes of these two cones are represented by the arrows in FIGS. 9A and 9B.

In the example in FIG. 9A, when the detection system 10 is placed on the ceiling of the room, the angle of incidence θ (in other words, the angle that can be tuned) is in a vertical plane; the slits themselves are in a horizontal plane.

Figure 10:
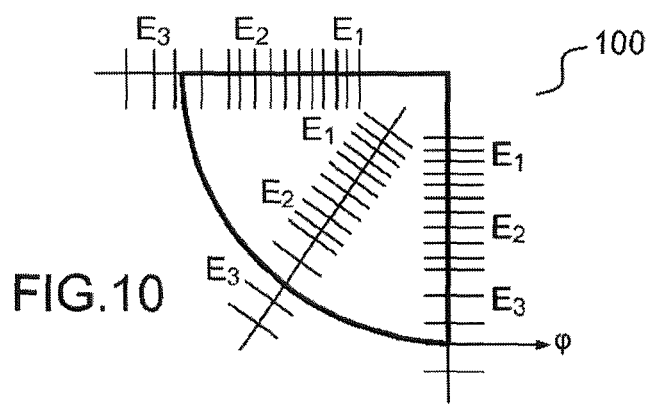
FIG. 10, one example of a device for selective filtering at several angles of incidence, designed for an implementation of a detection system such as shown in FIG. 9A.

FIG. 10 shows one example of a device for selective filtering at several angles of incidence, in the shape of a rosette, designed for the implementation of a detection system such as that shown in FIG. 9A, and also allowing space to be scanned in φ. In this example, the device for selective angular filtering comprises a array of angular filtering elements $E_i$ arranged in the form of one-dimensional matrices (barrettes), themselves laid out in the shape of a rosette. Each of the angular filtering elements $E_1$, $E_2$ and $E_3$ selects a different cone ($\theta_i$, $\phi_i=\pm20°$). It is thus the various branches of the rosette that allow the various azimuthal planes, and hence the various corners of the room, to be targeted. The overlapping of the signals detected on the matrix of detectors (for example, signals coming from two different barrettes not sufficiently separated in φ) is possible but should be limited as far as possible in order to facilitate the exploitation of the data.

In the example in FIG. 9B, when the detection system 10 is situated on the wall, the slits are advantageously oriented vertically. In this case, the plane φ=0 is horizontal (parallel to the ceiling), and all the corners of the room are scanned with the various angles θ. The implementation of a rosette such as that shown in FIG. 10 is therefore unnecessary in this case. In this configuration, it suffices to construct a patchwork layout of rectilinear filters (with vertical slits), each of the filters of which selects a different angle θ, which is equivalent to a single branch of the previous rosette. The implementation is simpler and the angular selectivity is no longer limited by Δφ but by Δθ (full width at half-height of the angular cone selected along θ). A higher angular selectivity may therefore be expected in this case (it is recalled that, in the illustrative example Δθ=±8°, while Δφ=±20°). Furthermore, if the patchwork layout of filters is placed in a corner of the room, it just needs to select angles θ in the range between −45° and 45° in order to scan the whole room. Similarly, a detector placed in the angle formed by the walls and the ceiling allows a detection over the whole room for angles θ in the range between −60 and 60 degrees.

Figure 11:
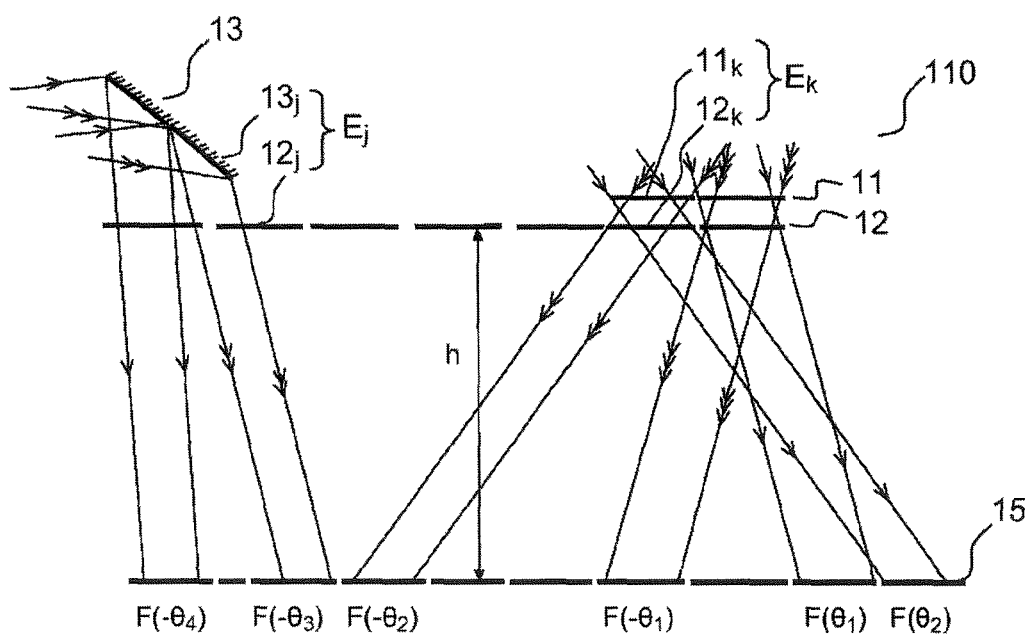
FIG. 11, another example of a multidirectional optical detection system according to the present description.

FIG. 11 shows another example of a multidirectional optical detection system 110 according to the present description.

In this example, the multidirectional detection system comprises a first matrix 11 of entry spectral filters operating in transmission mode, a second matrix 13 of entry spectral filters operating in reflection mode and a matrix 12 of exit spectral filters operating in transmission mode. With each exit spectral filter (for example $12_j$ or $12_k$) is associated one entry spectral filter, either from the first matrix of entry spectral filters (for example $11_k$) or from the second matrix of entry spectral filters (for example $13_j$), in order to respectively form angular filtering elements $E_j$, $E_k$. In this example, the first matrix of entry spectral filters 11, formed from transmission band-pass filters, allows the angles of incidence between around −40° and 40° to be collected; the second matrix of entry spectral filters 13, composed of reflection band-pass filters, allows the angles in the range between values less than −90° and −40° to be collected. A third matrix of entry spectral filters could be added operating in reflection mode, symmetric with the second matrix of entry spectral filters 13 with respect to the first matrix of entry transmission spectral filters 11 for collecting the angles in the range between +40° and values above +90°. It is thus possible, by virtue of the multidirectional detection system according to the present description, to go beyond 90° and to aim behind the detector. It is furthermore possible to differentiate on the detector matrix 15 both the different angles of incidence θ1 and θ2 and also the angle θ1 from its opposite −θ1.

Advantageously, the height h between the plane of the matrix 15 of optical detection elements and the matrix 12 of exit spectral filters is chosen to be sufficiently large in order to avoid overlapping of the detection elements. Typically, a height h greater than 6 times the distance between the two matrices of spectral filters may be chosen. Each detection element, or array of detection elements, thus only receives the light flux $F(\theta_i)$ incident on the filtering element whose angle of operation is $\theta_i$.

The matrices of spectral filters will be able to be fabricated according to known technologies, depending on the nature of the spectral filters used.

FIGS. 12A to 12I illustrate, more particularly, the steps for fabricating a matrix of spectral filters comprising guided mode resonance structures, of the type of those described in FIGS. 4, 5A, 5B.

Figure 12A:
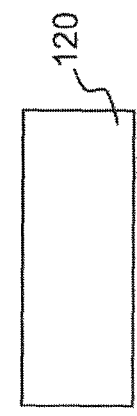
FIGS. 12A to 12I, the steps in the fabrication of a matrix of spectral filters, according to one embodiment of the present description.
Figure 12B:
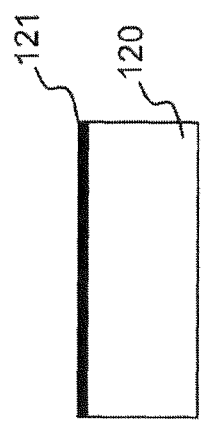
Figure 12C:
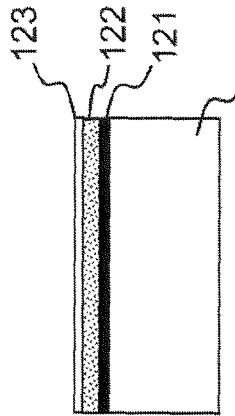
Figure 12D:
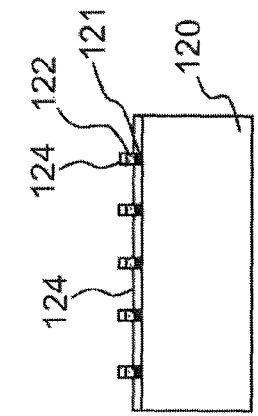
Figure 12E:
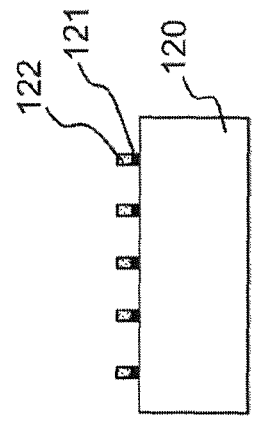
Figure 12F:
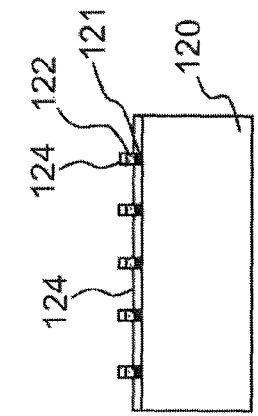
Figure 12G:
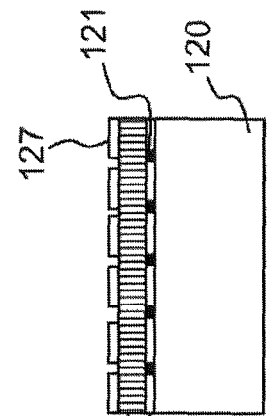
Figure 12H:
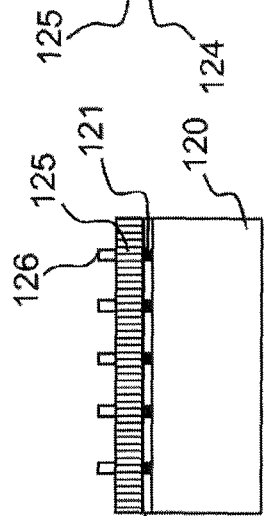
Figure 12I:
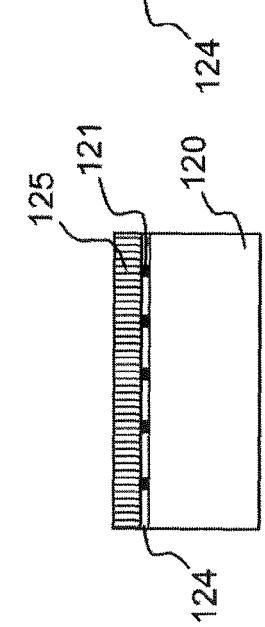

According to one example, the fabrication method can comprise the following steps:

Preparation of a double-side polished substrate 120, transparent in the spectral band sought, for example a substrate of polished sapphire (FIG. 12A), and forming the carrier for the matrix;

Deposition of a layer 121 of silicon carbide (SiC) in a sputtering tool (FIG. 12B);

Implementation of a first electron lithography step allowing an etch resist mask to be defined, comprising the deposition of a layer of resist 122, the deposition of a thin film of gold 123 (FIG. 12C), electron lithography so as to form a first pattern corresponding to the grating 403 (FIG. 4) for the various angular filtering elements of the matrix, the removal of the layer of gold and the development (FIG. 12D);

Etching of the layer of silicon carbide (121) by RIE (according to the abbreviation for the expression "Reactive Ion Etching") (FIG. 12E);

Deposition of a gold grating (124) in the slots created by the etching of the SiC (FIG. 12F);

Removal of the resist and deposition of a thick layer (125) of SiC (FIG. 12G);

Second lithography step with, where necessary, an alignment of the first and second pattern (FIG. 12H);

Lift-off of a gold grating (FIG. 12I).

Figure 13:
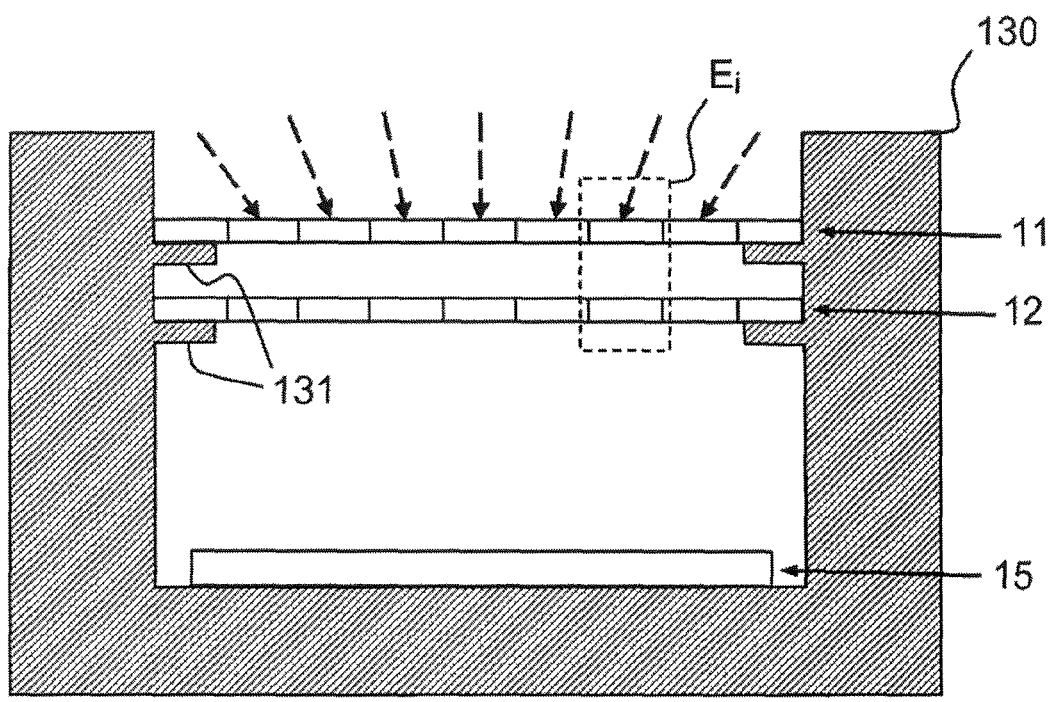
FIG. 13, one exemplary embodiment of a multidirectional optical detection system according to the present description.

Once formed, the matrices of spectral filters may be arranged in a suitable housing for receiving a matrix of optical detection elements, as is illustrated in FIG. 13.

In this example, a housing 130 is designed to receive two matrices 11, 12, respectively of entry and exit spectral filters, and a matrix 15 of optical detection elements. The matrices 11 and 12 are for example held by shims 131 and are typically separated by a few hundreds of micrometers. The matrix 15 of detection elements is positioned at a greater distance from the matrices of spectral filters, typically a few millimeters. The housing may be a cryostat, for example when the matrix 15 of optical detection elements needs to operate in a cooled or cold environment. It may be a vacuum chamber, for example when the matrix 15 of detection elements is composed of bolometers. It will be evident for those skilled in the art that the housing will be able to be adapted according to the number and to the shape of the matrices of entry and exit spectral filters, and also of the matrix of optical detection elements.

Although described via a certain number of detailed exemplary embodiments, the structure and the method of fabrication of the angular optical filtering element according to the invention comprises several variants, modifications and improvements which will be obvious to those skilled in the art, it being understood that these different variants, modifications and improvements form part of the scope of the invention, such as defined by the claims that follow.

The invention claimed is:

1. An angular optical filtering element ($E_i$) optimized for the angular filtering about a given angle of incidence of operation ($\theta_i$, $\phi_i$), within a given spectral band, comprising:
   a first nanostructured band-pass spectral filter (11$_i$, 301), comprising, within said spectral band, a first filtering central wavelength which exhibits a first angular dispersion curve, the angular dispersion curve representing the variation of the first filtering central wavelength determined as a function of the angle of incidence on the optical filtering element ($E_i$);
   a second nanostructured band-pass spectral filter (12$_i$, 302), comprising, within said spectral band, a second filtering central wavelength which exhibits a second angular dispersion curve representing the variation of the second filtering central wavelength determined as a function of the angle of incidence on the optical filtering element ($E_i$), the second angular dispersion curve being secant with the first angular dispersion curve around the angle of incidence of operation ($\theta_i$, $\phi_i$).

2. The angular optical filtering element as claimed in claim 1, in which at least one of the first and second spectral filters operate in transmission mode.

3. The angular optical filtering element as claimed in claim 1, in which at least one of the first and second spectral filters operate in reflection mode.

4. The angular optical filtering element as claimed in claim 1, in which one of the first and second spectral filters operates in absorption mode.

5. The angular optical filtering element as claimed in claim 1, in which the first and second spectral filters are arranged in non-parallel planes.

6. The angular optical filtering element as claimed in claim 1, in which at least one of the first and second nanostructured spectral filters is a guided mode resonance filter, a filter with free-standing metal or dielectric gratings, or else a filter comprising a resonance of the MIM (metal-insulator-metal) type.

7. The angular optical filtering element as claimed in claim 1, in which at least one of the first and second nanostructured spectral filters is an interference filter.

8. A device for selective angular filtering at several given angles of incidence, comprising an array of angular optical filtering elements as claimed in claim 1, each optimized for angular filtering about a given angle of incidence of operation ($\theta_i$, $\phi_i$).

9. The device as claimed in claim 8, in which the first nanostructured spectral filters are arranged according to at least a first one- or two-dimensional matrix (11), comprising a first plane carrier, and the second nanostructured optical filters are arranged according to at least a second one- or two-dimensional matrix (12), comprising a second plane carrier.

10. The device as claimed in claim 9, in which the first and second carriers are arranged in non-parallel planes.

11. A multidirectional optical detection system comprising a device for selective angular filtering as claimed in claim 8 and an array of optical detection elements (15$_j$), each optical detection element being associated with an angular optical filtering element for receiving the light flux transmitted by said angular optical filtering element at the angle of incidence of operation of said angular optical filtering element.

12. The multidirectional optical detection system as claimed in claim 11, in which one of the first or second spectral filters of an angular optical filtering element is an absorption filter formed by the optical detection element associated with said angular optical filtering element.

13. The multidirectional optical detection system as claimed in claim 11, in which the optical detection elements are bolometers.

14. The multidirectional optical detection system as claimed in claim 11, in which the optical detection elements are arranged according to a one- or two-dimensional matrix (15), comprising a plane carrier.

15. The multidirectional optical detection system as claimed in claim 11 furthermore comprising a housing (130) in which the device for selective angular filtering and the array of the optical detection elements are arranged.

16. A method for fabrication of a multidirectional optical detection system as claimed in claim 11 comprising:
   the fabrication of a first matrix of first spectral elements on a first plane carrier;
   the fabrication of a second matrix of second spectral elements on a second plane carrier;
   the fabrication of a third matrix of optical detection elements on a third plane carrier;
   the arrangement of said matrices in a housing.

* * * * *